Figure 1:
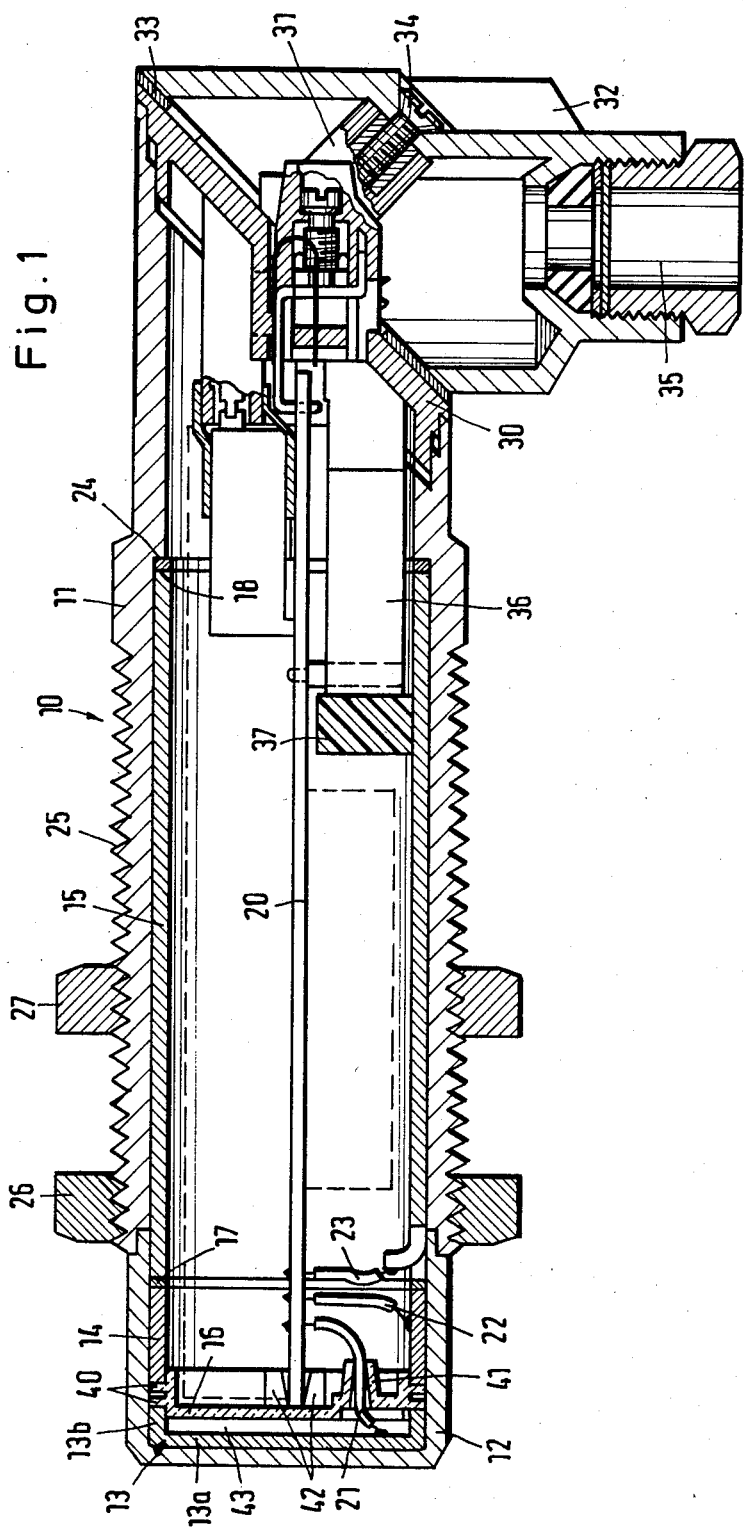

United States Patent [19]
Kröner

[11] Patent Number: 4,551,785
[45] Date of Patent: Nov. 5, 1985

[54] CAPACITIVE SENSOR

[75] Inventor: Holger Kröner, Schopfheim, Fed. Rep. of Germany

[73] Assignee: Endress u. Hauser GmbH u. Co., Maulburg, Fed. Rep. of Germany

[21] Appl. No.: 636,848

[22] Filed: Aug. 1, 1984

[30] Foreign Application Priority Data

Aug. 4, 1983 [DE] Fed. Rep. of Germany ....... 3328210

[51] Int. Cl.$^4$ .............................................. G01F 23/26
[52] U.S. Cl. ................................. 361/284; 73/304 C; 324/61 P
[58] Field of Search ...................... 361/284; 73/304 C; 324/61 P

[56] References Cited

U.S. PATENT DOCUMENTS 4,245,188  1/1981  Rottmar ............................ 324/61 P
4,412,270 10/1983  Weitz et al. ......................... 361/284

Primary Examiner—Donald A. Griffin
Attorney, Agent, or Firm—Barnes & Thornburg

[57] ABSTRACT

The capacitive sensor has a tubular plastic housing (10) which is closed at the front end and which consists of a tubular body (11) and a cup-shaped cap (12). In the cap (12) a pot-shaped sensor electrode (13) and a tubular guard electrode (14) are disposed. The tubular body (11) contains an electronic circuit (20) and a tubular shield electrode (15). The tubular electrodes (14, 15) are impact-resistant metal tubes, preferably of steel, and the pot-shaped sensor electrode (13) is an impact-resistant metal member, likewise preferably of steel. Between the electrodes (13, 14, 15) elastically deformable spacer members (16, 17) are inserted. For assembling the sensor the sensor electrode (13) and the guard electrode (14) with the spacer (16) disposed therebetween are arranged in the cap, and the shield electrode (15) is introduced from the front into the body (11) up to a stop (24) disposed in the body (11). Then, the cap (12) and the body (11) are fitted together and permanently joined to each other by ultrasonic welding. The easily assembled capacitive sensor thus formed is very resistant to shock and impact forces and therefore suitable for use in areas where there is a danger of explosion.

14 Claims, 2 Drawing Figures

CAPACITIVE SENSOR

The invention relates to a capacitive sensor having a tubular plastic housing closed at the front end, a sensor electrode disposed in the interior of the housing at the front end thereof, and at least one tubular shield electrode, the electrodes being arranged in the interior of the housing in such a manner that they adjoin each other a small distance apart, and an electronic circuit which is disposed in the interior of the housing and is connected on the one hand to the electrodes and on the other hand to a cable led at the back out of the housing.

Capacitive sensors of this type are used for example in the level measuring art, in particular as limit switches for detecting when a predetermined filling level is reached.

In the capacitive sensors of this type known in the art the plastic housing is a one-piece tubular member which is closed at the front end by an integrally formed end wall and is open at the rear end. The electrodes and the electronic circuit are introduced into the housing through the open rear end which is then closed by a suitable cover through which the connecting cable is led out. These capacitive sensors do not meet the requirements made for their use in certain fields. In particular, capacitive sensors which are used in areas where there is a danger of explosion must withstand all-round shock stresses exerted on the portion of the sensor projecting into the container. They are therefore subjected to a shock test in which axial and radial impact forces are exerted on the sensor. These impact forces must be taken up in the known sensors by the plastic housing alone because the tubular electrodes show no appreciable resistance to axial stresses and also, because of the material from which they are made and their dimensions, are unable to take up radial impact forces.

The problem underlying the invention is to provide a capacitive sensor of the type mentioned at the beginning which has an increased strength with respect to axial and radial shock stresses and is therefore particularly suitable for use in areas where there is a danger of explosion.

This problem is solved according to the invention in that plastic housing comprises a tubular body and a cup-shaped cap, that the sensor electrode is a shock-resistant metal part and is disposed in the cap, that the shield electrode is a shock-resistant metal tube and is disposed in the tubular body, that at the inner side of the body a stop is disposed on which the rear end of the shield electrode introduced from the front into the body is supported, and that the cup-shaped cap and the tubular body are fitted together and tightly connected to each other with interposition of an insulating spacer member between the electrodes.

In the capacitive sensor according to the invention (—) with interposition of the spacer members between the end wall of the cap and the stop disposed on the inner side of the body (the electrodes are clamped) so that this forms an inner tubular framework which has a high resistance to all-round shock stresses. The capacitive sensor thus meets the requirements for use in areas where there is a danger of explosion. The two-part formation of the housing permits simple assembly of the sensor because due to the stop disposed in the body it would not be possible to introduce the electrodes from the rear.

The two-part formation of the housing has other considerable advantages. Particularly, the same body can be used with different types of cap differently formed to receive different types of sensor electrodes. Also, caps can be used which have a color different to the body of the housing, for example for marking different sensor types.

The insulating spacer members disposed between the electrodes also play an important part as regard shock resistance. Since the electrodes consisting of metal are substantially undeformable in the exial direction, the spacer members take up the axial deformations. In particular, it is possible to construct one of these spacer members in such a manner that it forms a collapsible zone which is elastically deformed under an end-face impact.

Further improvements of the invention are characterized in the subsidiary claim.

Figure 2:
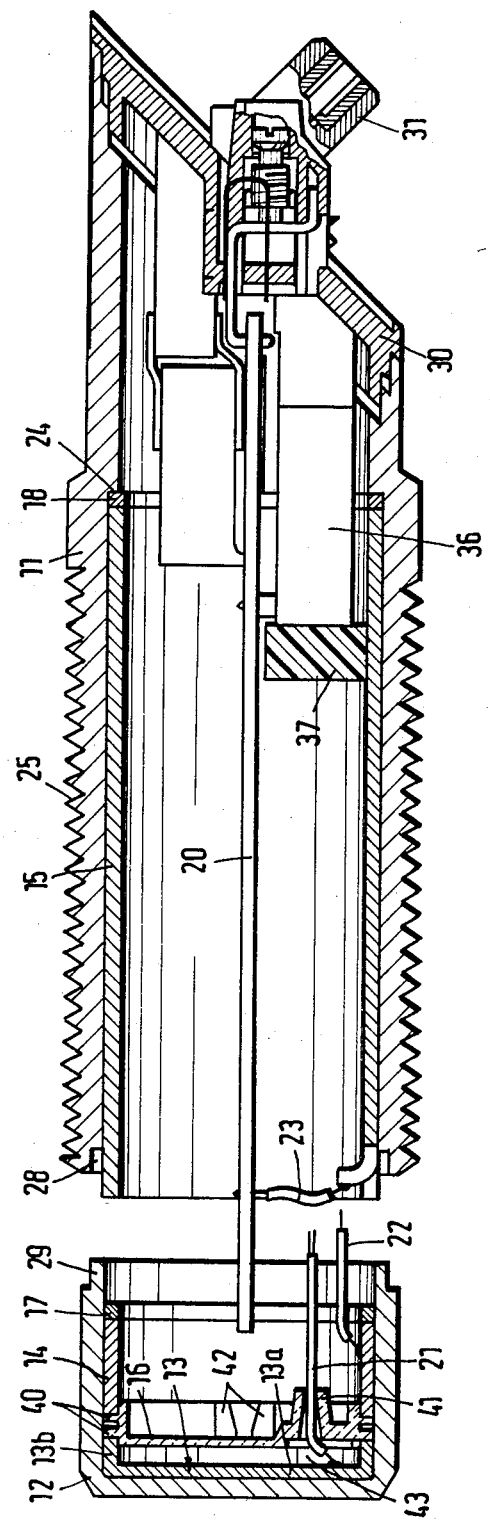

Further features and advantages of the invention will be apparent from the following description of an example of ebodiment illustrated in the drawing, wherein:

FIG. 1. is a longitudinal section through a capacitive sensor according to the invention in the assembled condition and FIG. 2. is a longitudinal section through the two housing parts with the components disposed therein prior to assembling the parts together.

The capacitive sensor illustrated in FIG. 1 has a tubular plastic housing 10 which is closed at the front end and consists of two parts, that is a tubular body 11 and a cup-shaped cap 12. In the interior of the housing 10 three electrodes are disposed, namely a sensor electrode 13, a guard electrode 14 and a shield electrode 15. The sensor electrode 13 has the form of a flat pot having a planar bottom 13a lying on the inner side of the end wall of the cap 12 and a peripheral edge 13b bent perpendicularly thereto. The guard electrode 14 is a tubular metal part of relatively short length which is disposed at a small distance behind the sensor electrode 13 in the interior of the cap 12 and bears on the cylindrical inner surfaces thereof. Between the electrodes 13 and 14 an insulating spacer disk 16 is disposed which keeps the two electrodes at the desired distance apart. The shield electrode 15 is a tubular metal part with the same cross-sectional dimensions as the guard electrode 14 but is of substantially greater length. The shield electrode 15 extends over the major part of the length of the tubular body 11 of the housing 10 and further projects slightly into the cap 12 where it terminates at a small distance from the guard electrode 14. Between the guard electrode 14 and the shield electrode 15 a spacer ring 17 is inserted. The electrodes 13, 14 and 15 may all consist of the same metal, preferably stainless or tinned steel. These metal parts are so shaped and dimensioned that they are very stable under impacts. Preferably, the electrodes 13 and 14 are formed by portions of a steel tube which can have for example a diameter of 26 mm and a wall thickness of 1.5 mm. The sensor electrode 13 can be formed from steel sheet of the same thickness.

In the body 11 of the housing a circuit board 20 is disposed whose front end portion projects into the cap 12 and bears on the spacer disk 16. The circuit board 20 carries the components of the electronic circuit of the capacitive sensor which are not illustrated in detail. The circuit components are connected together in the necessary manner by a printed circuit disposed on the circuit board 20 and not illustrated. Connecting wires, 21, 22 and 23 connect the electrodes 13, 14 and 15 to the printed circuit on the board 20.

The housing parts 11 and 12 may be made of the same plastic chosen for the necessary mechanical, chemical and electrical properties, or alternatively from different plastics Polycarbonates have been found particularly suitable, for examples for the cup-shaped cap 12 the polycarbonate plastic Makrolon type 6030 and for the tubular body 11 the polycarbonate plastic Orgalon type I 2700. The body 11 has a stepped internal diameter which from the front end over the major part of its length is equal to the external diameter of the shield electrode 15 whilst the rear end portion of the body 11 has a somewhat smaller diameter so that an annular shoulder 24 is formed on which the rear end face of the tubular shield electrode 15 bears with interposition of a spacer ring 18 of resilient plastic, for example silicone rubber. The wall thickness of the tubular body 11 is substantially uniform so that the portion surrounding the tubular shield electrode has a somewhat greater external diameter. In this portion a thread 25 is formed which serves to secure the capacitive sensor in a wall opening, for example with the aid of two ring nuts 26 and 27 screwed into the thread 25. The front end face of the tubular body 11 is provided with an annular recess 28 (FIG. 2) into which an annular step 29 formed on the rear end of the cap 12 engages. The two housing parts 11 and 12 are connected together by ultrasonic welding resulting in a firm joint between these two parts.

The rear end of the housing body 11 is cut off at an angle of 45° and into the resulting inclined opening a terminal plate 30 of insulating material is inserted and secured therein for example by ultrasonic welding. The terminal plate 30 carries terminals to which the electronic circuit disposed on the board 20 is connected. Projecting perpendicularly from the terminal plate 30 is an internally threaded tubular member 31. On the inclined terminal plate 30 a bushing member 32 provided with a corresponding inclined face can be secured in two different angular positions with interposition of a seal 33 by means of a screw 34 engaging in the threaded tubular member 31 so that a cable passage 35 disposed at the bushing member 32 is either at right-angles to the longitudinal axis of the housing as illustrated in FIG. 1 or, when the bushing member 32 is attached turned through 180°, lies in the axial extension of the housing axis. The bushing member 32 serves for the passage, sealing and tension-relieving securing of a cable which can be connected to the terminals of the terminal plate 30 and thereby establishes the connection between the circuit board 20 and external apparatuses. By means of the inclined face connection between the housing 10 and the bushing member 32 the passage out of the cable can be adapted to the local circumstances.

The terminal plate 30 also carries the circuit board 20 by means of a connection piece 36 which is secured to the terminal plate 30 and the free and of which is secured to a foam member 37 serving for the support.

The spacer disk 16 is a plastic molding of relatively hard resilient plastic. Particularly suitable are thermoplastically workable polyurethane elastomers, for example the plastic commercially available under the name Desmopan with the hardness of 80 Shore. The plastic molding has the form of a shallow shell having two annular ribs 40 which extend spaced from each other about the periphery and lie between the sensor electrode 13 and the guard electrode 14. A truncated conical bushing 41 integrally formed on the spacer 16 accommodates the connecting wire 21 which connects the sensor electrode 13 to the circuit board 20. Furthermore, on the spacer disk 16 two projections 42 are integrally formed which in the assembled condition accommodate and support the end portion of the circuit board 20. The opposing surfaces of the projections 42 are bevelled to facilitate insertion of the circuit board 20 on assembly.

The spacer ring 17 between the guard electrode 14 and the shield electrode 15 consists like the spacer ring 18 of a resilient plastic, for example a silicone rubber with the hardness 40 Shore.

Assembly of the capacitive sensor will be explained with the aid of FIG. 2 which shows the two housing parts 11 and 12 (with the components disposed therein prior to the assembly).

The circuit board 20 equipped with the electronic circuit has been secured outside the housing body 11 by means of the connecting piece 36 to the terminal plate 30, whereupon the necessary connections are established between the circuit board 20 and the terminals disposed on the terminal plate 30. The shield electrode 15 is inserted together with the spacer 18 from the front into the tubular body 11 until its rear end face bears via the spacer ring 18 on the annular shoulder 24. The circuit board 20 is introduced from the rear into the housing until the terminal plate 30 lies properly in the inclined rear opening of the body 11. The terminal plate 30 is now fixedly connected to the housing body 11 by ultrasonic welding. The foam member 37 disposed at the front end of the connecting piece 36 bears on the inner side of the tubular shield electrode 15 and serves to provide additional mechanical support for the circuit board 20. The connection can now be established between the circuit board 20 and the shield electrode 15 by the connecting wire 23. The components of the capacitive sensor accommodated in the housing part 11 have then reached the assembly stage illustrated in FIG. 2. The tubular shield electrode 15 projects somewhat beyond the front end of the tubular body 11 and the circuit board 20 projects beyond the front end of the tubular shield electrode 15.

The sensor electrode 30 with the connecting wire 21 soldered thereto, the spacer disk 16, the tubular guard electrode 14 with the connecting wire 22 soldered thereto and the spacer ring 17 are introduced consecutively into the cup-shaped cap 12 so that the components assume the positions illustrated in FIG. 2. When the connecting wires 21 and 22 have been soldered to the circuit board 20 the step 29 is inserted into the recess 28 until the housing body 11 and the cap 12 bear on each other without gaps. The resilient spacer rings 17 and 18 are compressed, compensating any tolerances. Thereafter, the housing parts 11 and 12 are permanently bonded together at the joint by ultrasonic welding. Finally, the entire interior of the housing 10 can be filled with a casting compound through an opening (not illustrated) provided in the connecting plate 30. This completes the assembly of the capacitive sensor.

In the assembled state which is illustrated in FIG. 1 the electrodes 13, 14 and 15 are firmly clamped between the end wall of the cap 12 and the annular shoulder 24 with interposition of the spacer members 16, 17 and 18. The resilient deformation of the spacer rings 17 and 18 compensates any tolerances.

The three electrodes 13, 14 and 15 form together with the spacer members 16, 17 and 18 a framework which imparts to the sensor a high resistance to axial and radial shock stresses. The peripheral edge 13b of the pot-shaped sensor electrode 13 results in the formation between the bottom 13a and the spacer disk 16 of a cavity 43 which takes up the resilient deformations of the bottom 13a caused by axial impacts without any danger of damage to the spacer disk 16. The ribs 40 of the spacer disk 16 lying between the peripheral edge 13b and the guard electrode 14 form a collapsible zone which accommodates the axial impacts transmitted via the peripheral edge 13b. The ribs 40 are formed so that they are elastically compressed by such axial impact forces and when the load is removed again assume the original form and position. The abutment for taking up the axial impacts is the shoulder 24 to which the impacts are transmitted via the steel tubes forming the electrodes 14 and 15, the resilient spacer rings 17 and 18 disposed therebetween giving a buffer effect.

The foam member 37 resiliently absorbs axial impacts transmitted via the casting composition and transmits them via the connecting piece 36 to the connecting plate 30, the circuit board 20 thus being protected from axial impacts.

Radially acting shock forces are taken up primarily by the shield electrode 15 which because of its construction as steel tube exhibits great resistance to radial stresses. The projecting front end portion of the tubular shield electrode 15 stiffens the joint between the housing parts 11 and 12. The cup-shaped cap 12 is also very well stiffened against radial impact stresses by the tubular guard electrode 14 and the pot-shaped sensor electrode 13. The electrodes 13, 14 and 15 are constructed firstly by the choice of the material (steel) and secondly by their form and dimensions so that they can resiliently take up the shock stresses occurring without permanent deformation.

The two-part construction of the housing 10 permits and facilitates the assembly of the capacitive sensor. For because of the shoulder 24 provided as mechanical abutment for taking up the impacts installation of the electrodes from the connection side as usual in known capacity sensors is no longer possible. Moreover, the two-part construction of the housing has further advantages. For instance, it is possible to attach to the same housing part 11 with shield electrode and circuit board disposed therin different types of cap 12. These caps may for example have different forms for receiving different sensor electrodes and they may have different colors for marking different sensors.

The form of the sensor described is not of course restricted to the case where three electrodes are present, i.e. apart from the sensor electrode and the shield electrode a guard electrode disposed therebetween. The modification for capacitive sensors having only a sensor electrode and a tubular shield electrode is readily ovious to the expert. In this case only the sensor electrode with the spacer disk is disposed in the cup-shaped cap and the shield electrode extends up to the spacer disk, this being achieved by suitable dimensions of the cap and/or of the projecting portion of the shield electrode. Of course, the peripheral edge of the pot-shaped sensor electrode may also be correspondingly longer.

In each case the capacitive sensor has a high mechanical strength and is particularly very resistant to axial and radial shock stresses. The tubular shield electrode surrounding the circuit board provides very good electrical shielding of the electronic circuit.

I claim:

1. A capacitive sensor comprising a tubular plastic housing closed at the front end, a sensor electrode disposed in the interior of the housing at the front end thereof, at least one tubular shield electrode, the electrodes being arranged in the interior of the housing in such a manner that they adjoin each other a small distance apart, an electronic circuit which is disposed in the interior of the housing and is connected on the one hand to the electrodes and on the other hand to a cable led at the back out of the housing, the plastic housing including a tubular body and a cup-shaped cap, the sensor electrode being formed of a shock-resistant metal member and being disposed in the cap, the shield electrode being an impact-resistant metal tube and being disposed in the tubular body, a stop disposed on the inner side of the tubular body for supporting the rear end of the shield electrode introduced from the front into the body, an insulating spacer member between the electrodes, and means for tightly connecting the cup-shaped cap and the tubular body to each other.

2. A capacitive sensor according to claim 1, further comprising a tubular guard electrode disposed coaxially to the shield electrode in such a manner that it lies a small distance from the sensor electrode and the shield electrode, the guard electrode is an impact-resistant metal tube and is disposed together with the sensor electrode in the cap with interposition of the insulating spacer member.

3. The capacitive sensor according to claim 1 wherein the sensor electrode is pot-shaped.

4. The capacitive sensor according to claim 1 wherein the electrodes consist of steel.

5. The capacitive sensor according to claim 1 wherein the stop is formed by an annular shoulder in the tubular housing body.

6. The capacitive sensor according to claim 5, further comprising an elastically deformable spacer ring inserted between the shield electrode and the stop.

7. The capacitive sensor according to claim 1 wherein the shield electrode has a length such that it projects beyond the front end of the tubular housing body when it is inserted up to the stop.

8. The capacitive sensor according to claim 1 wherein the insulating spacer members between the electrodes are elastically deformable.

9. The capacitive sensor according to claim 8 wherein at least one of the spacer members disposed between the electrodes consists of an elastomer, for example, silicone rubber.

10. The capacitive sensor according to claim 8 wherein at least one of the spacer memebers disposed between the electrodes is a plastic molding with a configuration permitting the deformation.

11. The capacitive sensor according to claim 10 wherein the plastic molding has two spaced-apart peripheral ribs which lie in the intermediate space between the electrodes and under the action of an impact stress at the end face are elastically deformable towards each other to form a collapsible zone.

12. The capacitive sensor according to claim 10 wherein the plastic molding consists of a polyurethane elastomer.

13. The capacitive sensor according to claim 10 wherein the electronic circuit is disposed on a circuit board disposed in the interior of the housing, the circuit board is secured in the tubular housing body, the cirucit board has a length such that in the assembled condition of the housing the board extends up to the plastic molding disposed in the cap and the plastic molding includes projections between which the end portion of the circuit board is inserted.

14. Capacitive sensor according to claim 1 wherein the means for connecting the tubular housing body and the cap is an ultrasonic weld.

* * * * *